Figure 1:
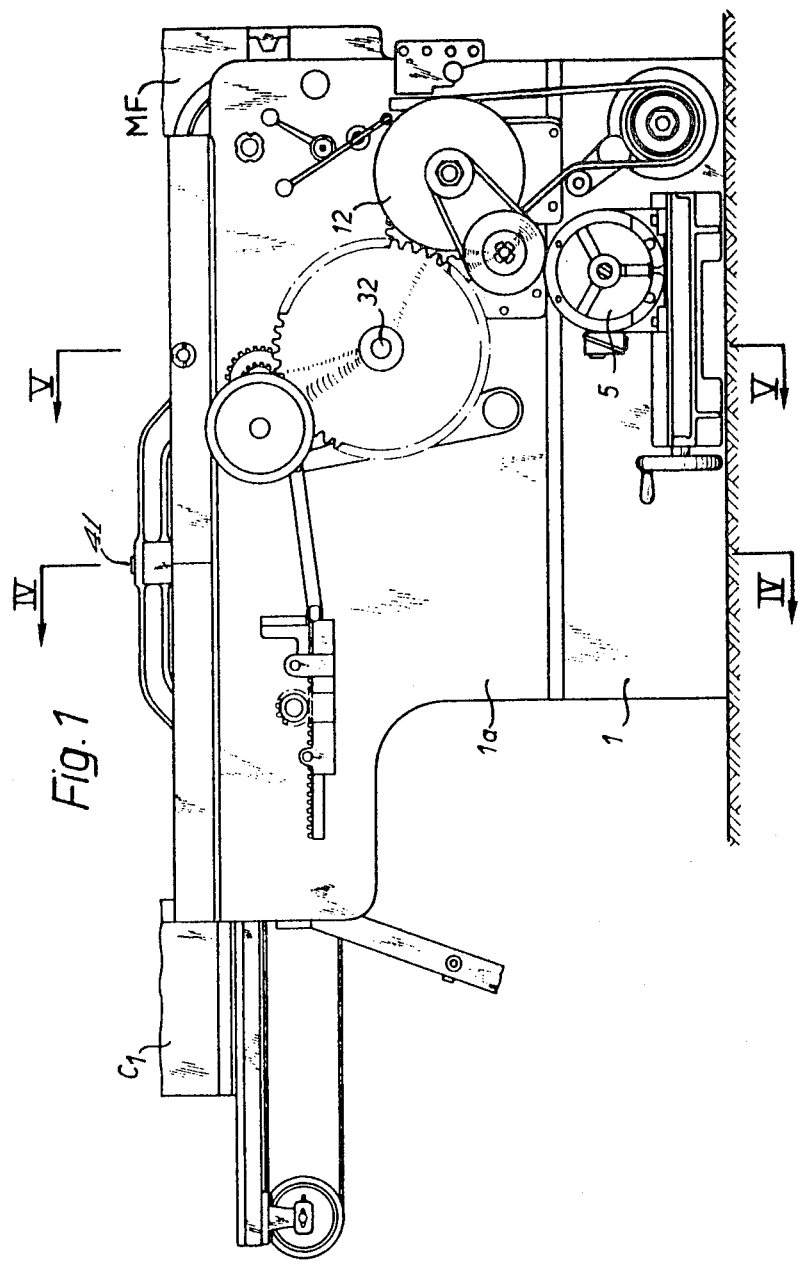

March 1, 1966 H. W. TAYLOR 3,237,223
BOOK-COVER MANUFACTURING MACHINE
Filed June 2, 1964 8 Sheets-Sheet 1

March 1, 1966 H. W. TAYLOR 3,237,223
BOOK-COVER MANUFACTURING MACHINE
Filed June 2, 1964 8 Sheets-Sheet 6
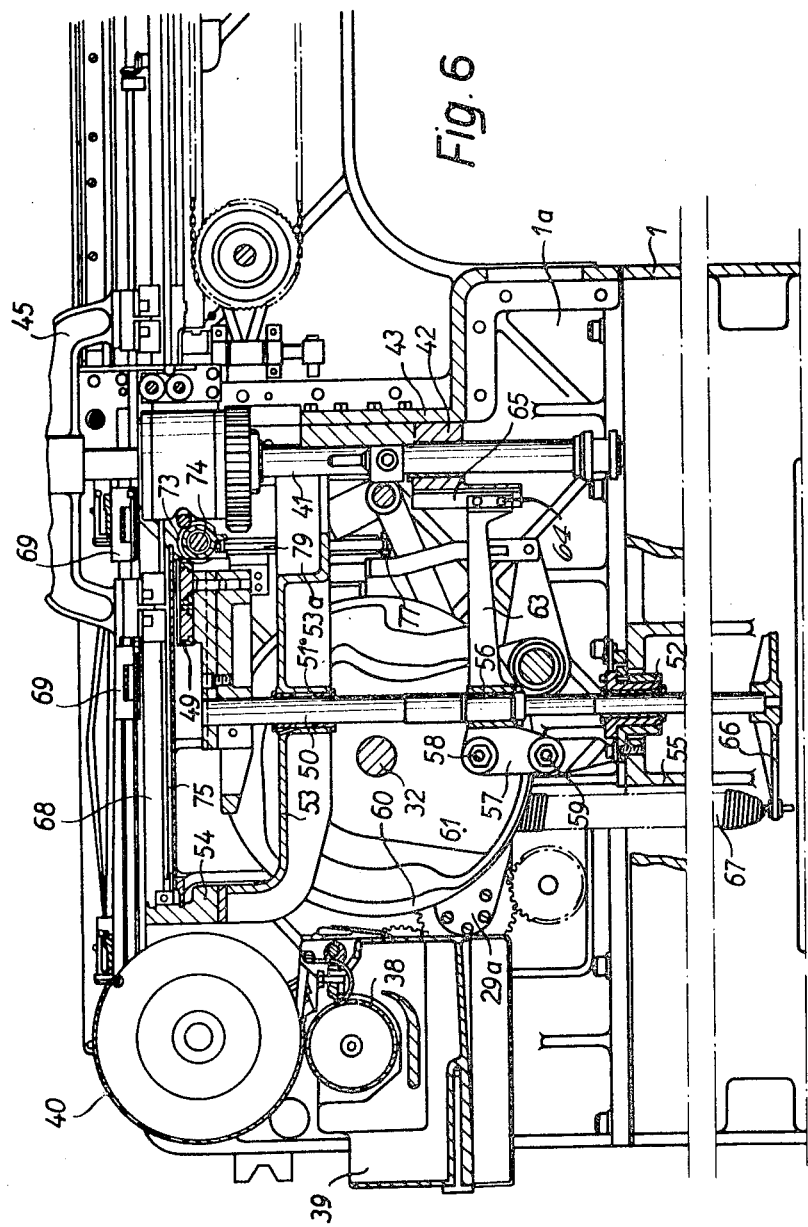

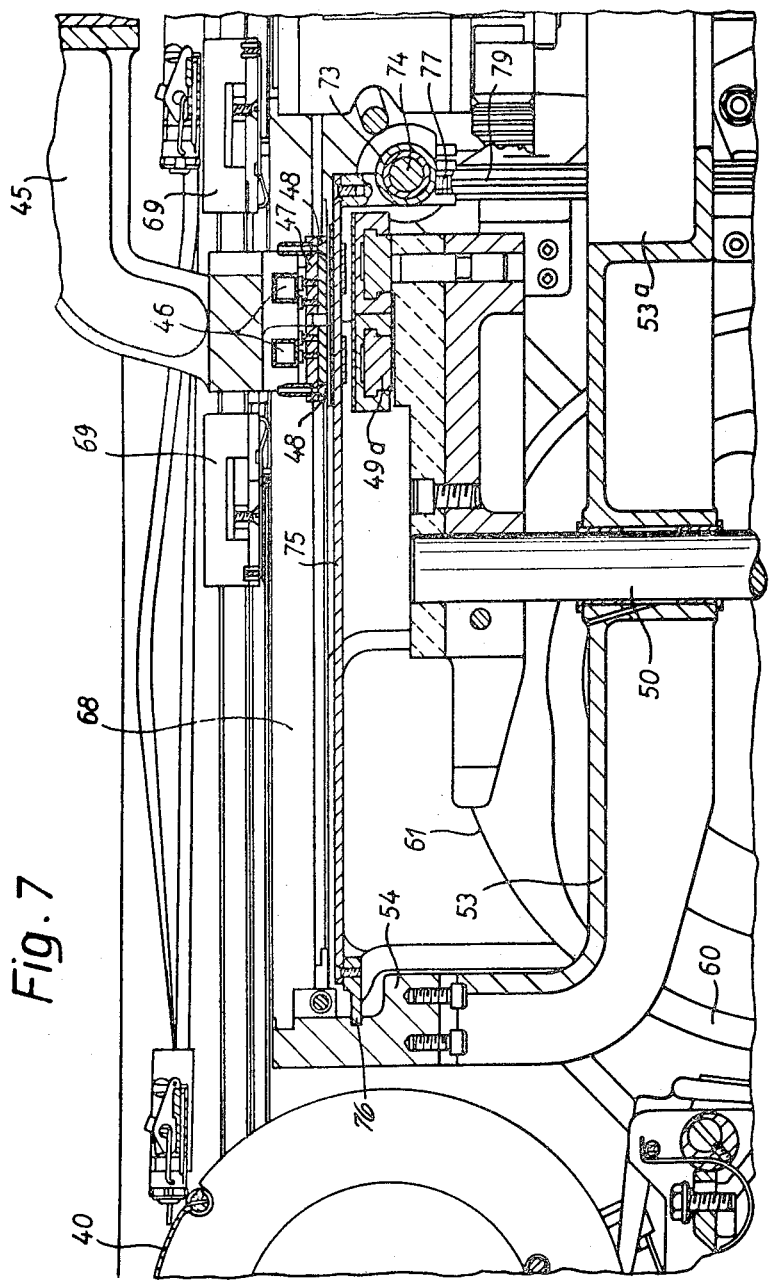

March 1, 1966  H. W. TAYLOR  3,237,223
BOOK-COVER MANUFACTURING MACHINE
Filed June 2, 1964  8 Sheets-Sheet 8

United States Patent Office 3,237,223
Patented Mar. 1, 1966

3,237,223
BOOK-COVER MANUFACTURING MACHINE
Harry William Taylor, London, England, assignor to
Smyth Europea S.p.A., Milan, Italy
Filed June 2, 1964, Ser. No. 371,897
Claims priority, application Italy, June 22, 1963,
13,280/63
3 Claims. (Cl. 11—2)

This invention relates to a machine for manufacturing book-covers.

Known machines of this kind generally comprise a frame; a device provided with a rotary cylinder or so-called "cloth cylinder" which carries along the lining sheets, and an applicator roller cooperating with the cloth cylinder for applying adhesive to the said sheets; a vertically movable platform on which the paperboard blanks and back portion are superimposed and secured to the lining sheet; means cooperating with the said platform for bending over the marginal portions of the said lining sheet; means for receiving the lining sheets coated with an adhesive from the cloth cylinder and transferring them to the said platform; a feed device for the paperboard blanks and back portions comprising two chargers containing the paperboard blanks and a spool, respectively, for the tape from which the back portions are made; a feed table for the paperboard blanks; a mechanism for conveying the paperboard blanks from the charges and the tape from the spool to the feed station; a transfer member comprising at least one suction head carried by a vertically movable vertical shaft which is rotatable step by step for receiving the paperboard blanks and back portions from the feed station for transfer to the platform; means for removing the finished book-covers from the platform and discharging them from the machine; finally control means comprising a main driving shaft or cam shaft, cams mounted on the said shaft, leverages and secondary drives adapted to drive the abovementioned mechanisms on the machine in mutually synchronized relation.

In machines of this type the means for removing finished book-covers from the platform comprises a bar mounted for transverse displacement to the machine arranged at a height such as to engage the book-cover on the platform when the latter is in the position corresponding to the completion of the automatic book-cover manufacturing steps. The bar is secured to a slide movable along a guide arranged between the side-walls of the machine frame and secured to a chain which is reciprocated by a fixed extent from a toothed wheel fast with a pinion meshing with a reciprocating rack, through a leverage, from a cam carried by the machine cam shaft.

Since each machine of the type in question is constructed to be adaptable to manufacture book-covers varying in size, and can have mounted thereon very large or very small platforms, the stroke length of the bar removing the finished book-covers from the platform should be arranged to meet conditions of use of the largest platform acceptable by the machine. The starting position of the bar should in turn be such as not to interfere with the vertical movements of the platform.

The fact that the starting position of the bar for removal of the book-cover from the platform is fixed gives rise to serious drawbacks where the machine should operate with small size platforms for manufacturing small book-covers. Interengagement of the bar and book-cover to be removed takes place when the bar has already attained its highest linear speed, which results in impacts apt to effect undesirable displacements of the book-covers, before they ultimately leave the platform. Moreover, since the stroke length of the bar is a fixed one, the bar speed should be such that largest and smallest size book-covers can be removed within the pre-established time.

This considerable speed which is conferred to the discharge bar can give rise to further drawbacks on insertion of the book-cover into the press which flattens the cover and ultimately directs it out of the machine proper.

This invention provides a machine of the type referred to above which avoids these drawbacks and insures correct removal of finished book-covers from the platform, independently of the size of the book-covers being manufactured, and correct insertion thereof into the press.

With the above objects in view the machine according to this invention is equipped with a mechanism operating the book-cover removing bar comprising, in a manner known per se, means for varying the starting position of the bar, and of a construction such that the stroke length of the bar substantially equals the spacing of the edge of the smallest size book-cover which can be manufactured on the machine, opposite the bar, and the region at which the book-cover is taken up by the press.

Figure 2:
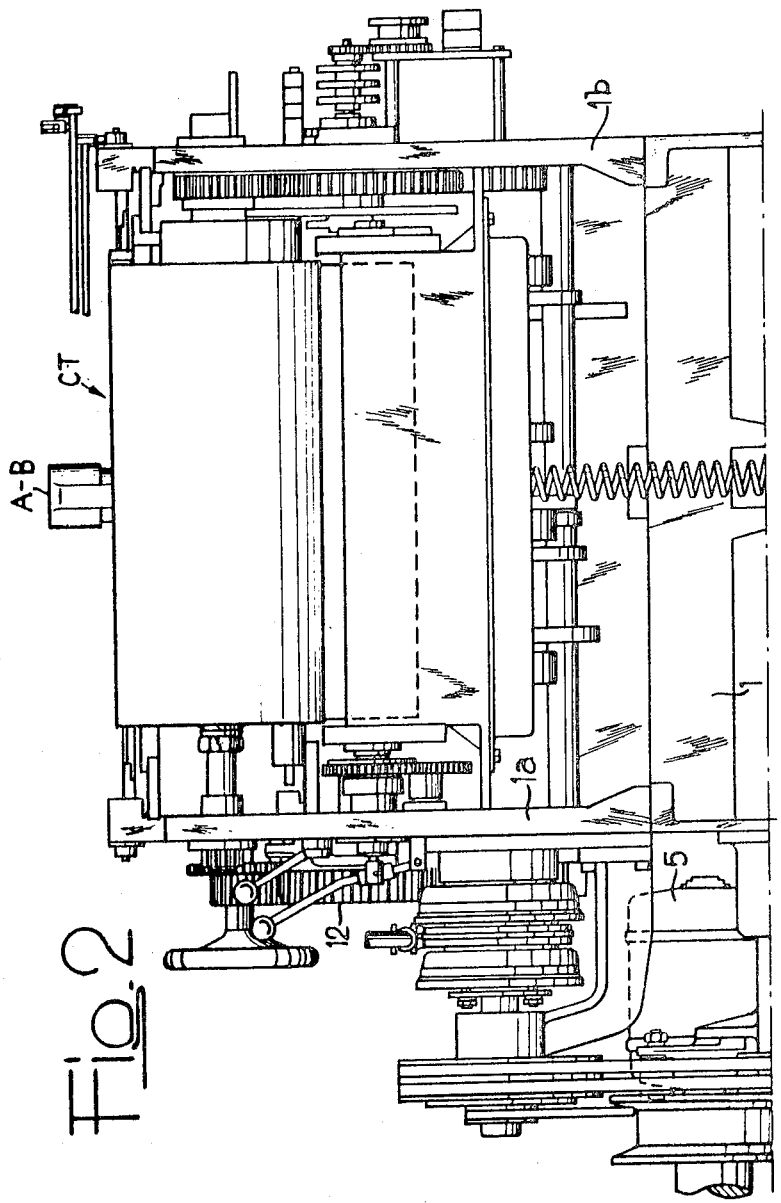
Figure 3:
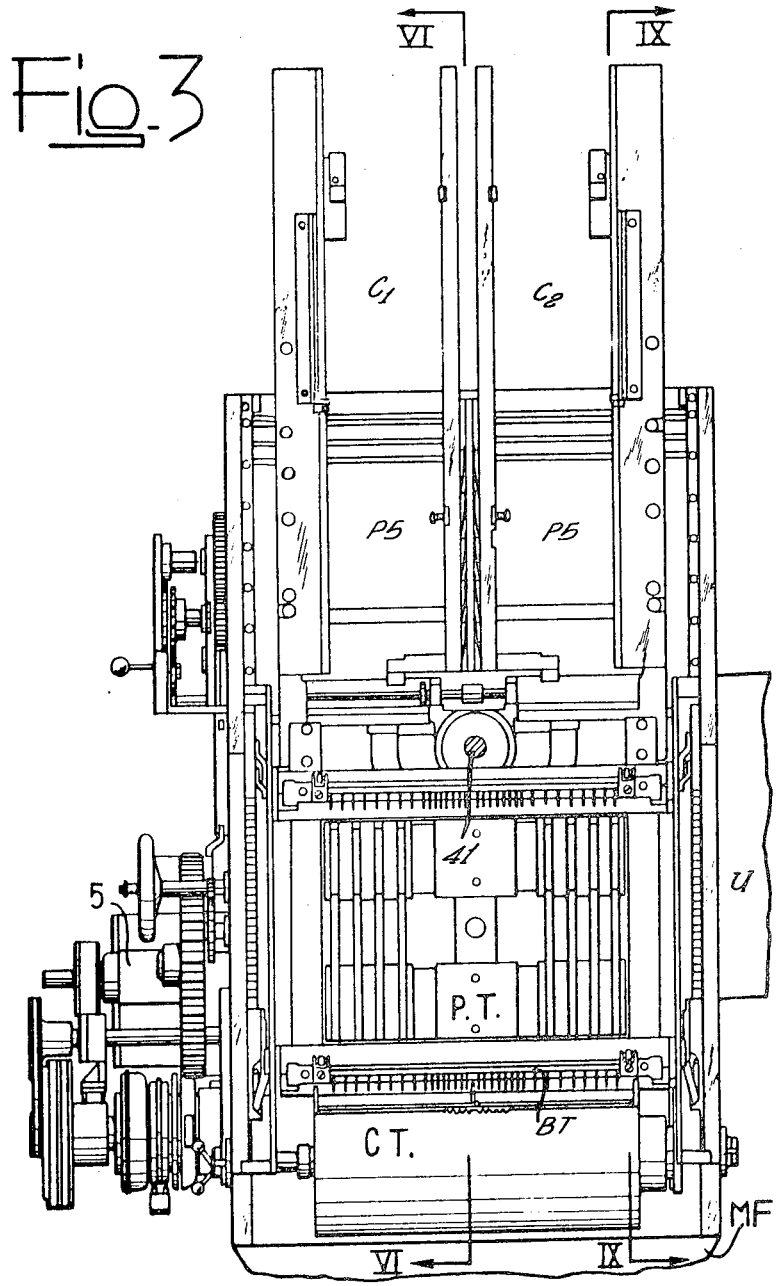
Figure 4:
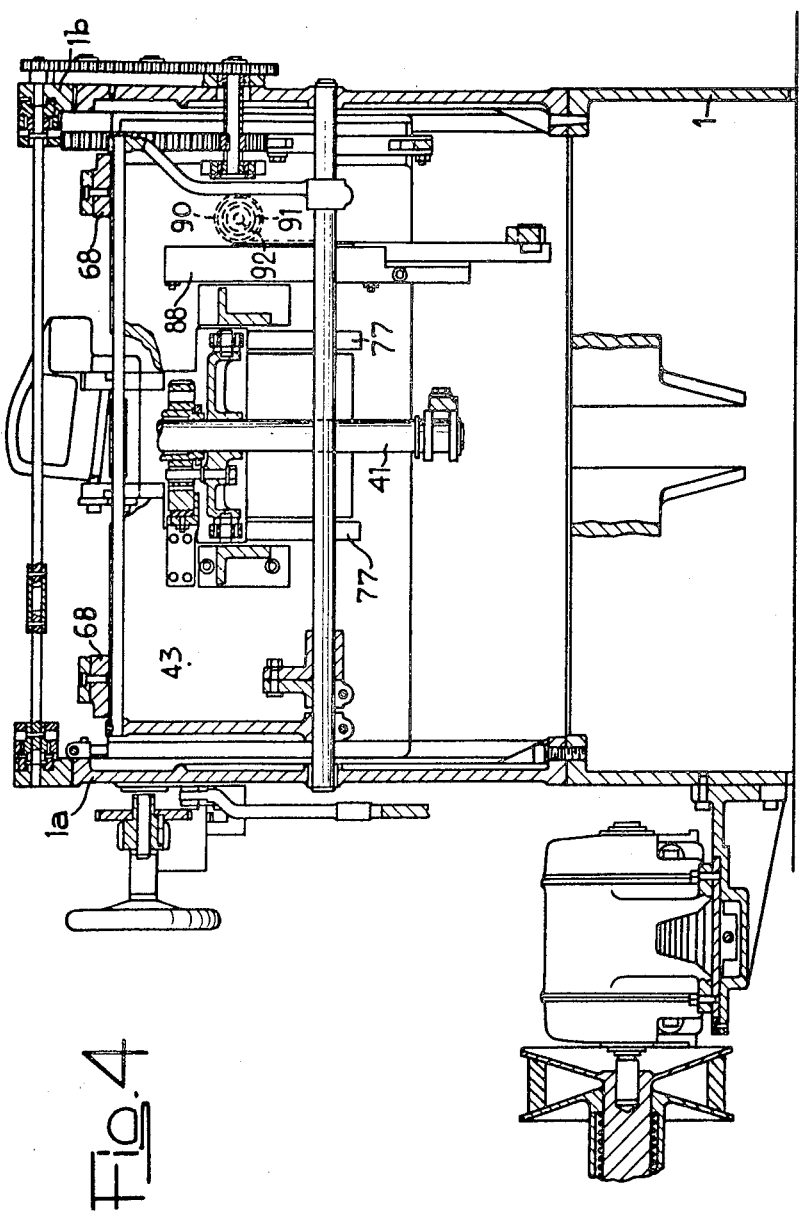
Figure 5:
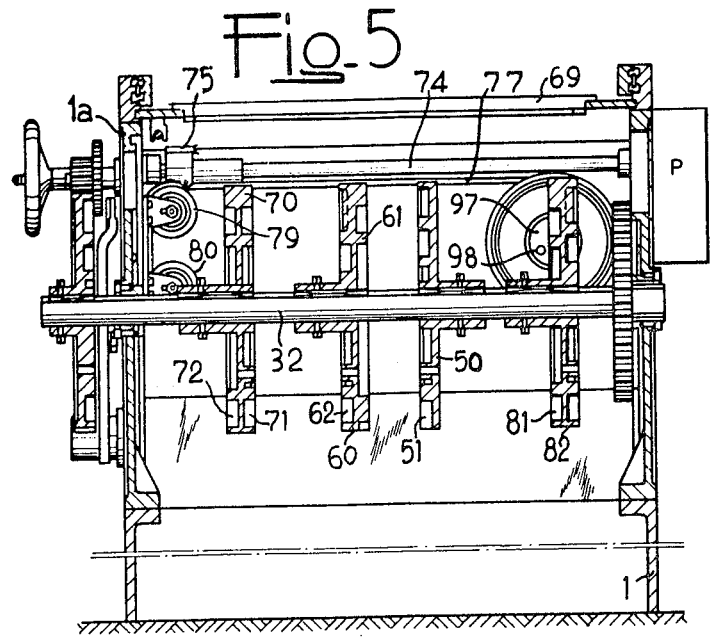
Figure 8:
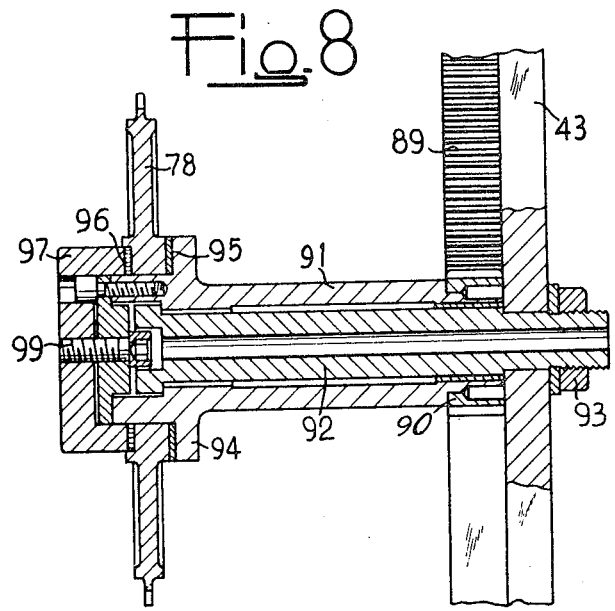
Figure 9:
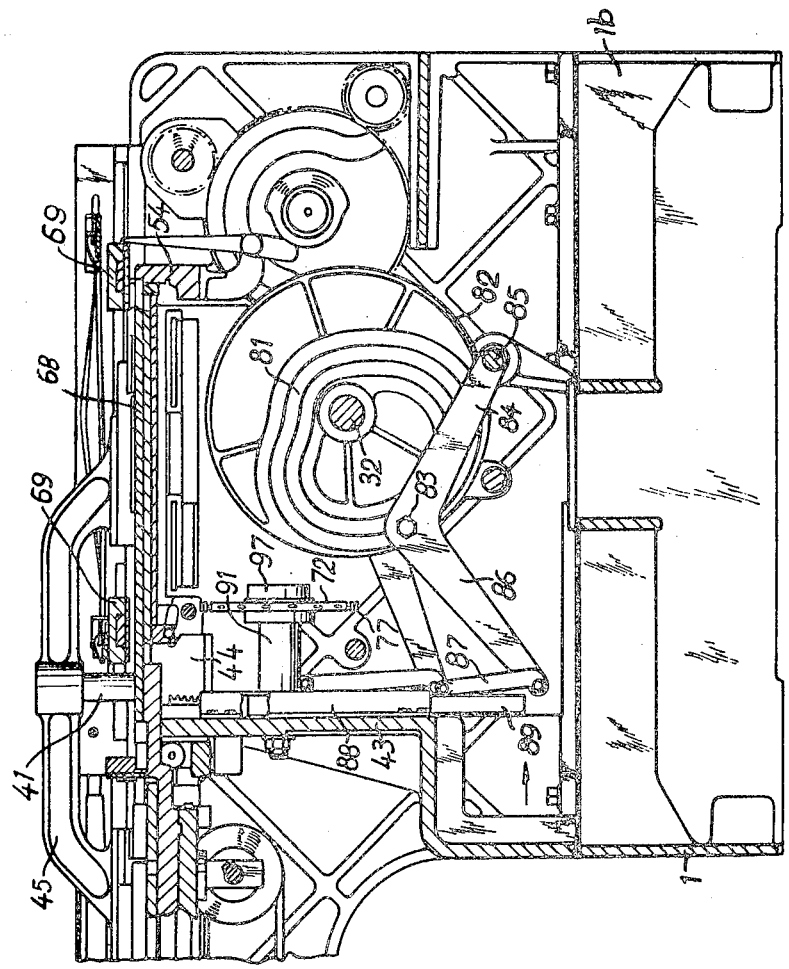

Further characteristic features and advantages of the machine will be clearly understood from the appended description referring by way of example to an embodiment shown on the accompanying drawings, wherein:

FIGURE 1 is a side elevational view of the machine according to this invention,
FIGURE 2 is a front view,
FIGURE 3 is a plan view,
FIGURES 4 and 5 are sectional views on line IV—IV and V—V, respectively of FIGURE 1.
FIGURE 6 is a sectional view on line VI—VI of FIGURE 3,
FIGURE 7 is a sectional view on an enlarged scale of a constructional detail of the machine,
FIGURE 8 is a sectional view on an enlarged scale of a further constructional detail of the machine,
FIGURE 9 is a sectional view on line IX—IX of FIGURE 3.

The general goemetry of the machine is visible more particularly in FIGURE 3 which is a plan view.

The two chargers $C_1$, $C_2$ each contain a plurality of paperboard blanks adapted to form the cover blank boards. At the squaring station PS two similar paperboard elements carried from the chargers $C_1$, $C_2$ are arranged with their edges facing the back portion pending transfer to the vertical movable platform PT on which the paperboard elements and back portion are glued to a lining sheet or cloth coated with adhesive. At the station CT a device is provided for coating the cloths with adhesive and delivering them to the transfer bar BT which transfers the cloths to the platform PT. A shaft 41 is provided with one arm at least, FIGURES 1 and 2, carrying a suction head which receives the paperboards and back portion from a squaring station PS and supports them till they are deposited on the cloth on platform PT. A sheet feeder MF feeds the cloths to the device CT, a discharging device U removing the finished book-covers from the machine.

The machine shown on the drawings comprises a foundation 1 having mounted thereon the machine frame comprising two sidewalls 1a, 1b braced by cross walls.

The sidewall 1a of the frame and underlying sidewall of the foundation 1 carry a motor 5 and drive members interconnecting the motor and cam shaft 32, FIGURE 5, and adhesive applicator roller 38 located beneath the cloth cylinder 40. The arrangement of the motor 5 and constructional details of the drive shall not be described in detail as they are disclosed, for instance, by the prior application Ser. No. 334,866, December 31, 1963.

The vertical shaft 41, FIGURES 1, 3, 4 and 6 is arranged between the sidewalls 1a, 1b of the frame in such manner that its axis is situated in the longitudinal middle plane of the machine as well as a transverse plane offset from the cam shaft 32 oppositely to the end of the machine frame supporting the cloth cylinder 40 and applicator rollers 38.

This shaft is mounted for rotation and axial displacement in a vertical direction in a bottom bearing 42, FIGURE 6, secured to the cross wall 43 interconnecting the sidewalls 1a, 1b of the frame, and in a top bearing, FIGURE 9, denoted by 44, which is secured, similarly to bearing 42, to the wall 43. A double arm 45, FIGURES 1, 6 and 7, is mounted on the top of shaft 41 and has its ends bent downwardly and ending by cross members 46. The cross members carry in turn supports 47 adjustable in position from which suction cups 48 depend and are connected through conduits not shown with a vacuum pump.

As will be seen from the drawings, the cup suction unit supported at each end by the arm 45 forms a suction head which is diametrically opposite the suction head formed by the suction cup carried at the other end of the arm 45.

The suction cup which may be either small FIGURE 7, or large, FIGURE 9, depending upon the size of the book covers, are adapted to draw the two paperboard blanks and back portion at the squaring station PS and transfer them to a diametrically opposite position for deposition on a lining sheet or so-called cloth previously placed on the movable platform PT.

For transfer of the paperboard blanks and back portion the shaft 41 should be first lifted from its lowermost position shown in FIGURE 7 to its topmost position shown in FIGURE 4, then rotated through 180°. It is understood that during transfer of the paperboard blanks and back portion by one suction head, the other suction head is first lifted above the platform, then rotated and located above the squaring station for the paperboard blanks. During subsequent lowering of the shaft 41 together with the double arm 45, the latter suction head is lowered on the fresh pair of paperboard blanks and back portion which have in the meantime been transferred to the squaring station, the other suction head depositing the paperboard blanks and back portion held by the said head on the fresh sheet or lining cloth which has in the meantime been placed on the platform.

A movable platform 49, FIGURE 6, is arranged in the gap between the cloth cylinder 40 and shaft 41 carrying the suction heads. This platform is supported by a vertical shaft 50 mounted for displacement in bearings 51, 52. The former bearing is carried by a central plate 53 secured by one end to a cross member 54 interconnecting the sidewalls 1a, 1b in proximity to the cylinder 50, ending at its other terminal by a fork, the legs 53a of which are secured to the rear wall 43. The latter bearing is secured to the cross member 55 provided on the foundation 1.

A lever 56 is secured to the portion of the shaft 50 overlying the bearing 52. The lever carries at one end two rollers (not shown) mounted for rotation about pivots 58, 59, cooperating with the edges of an annular cam 60 provided on the face turned towards the shaft 50 of a disc 61 mounted on the cam shaft 32, the other disc face being formed with a cam path 62, FIGURE 5, which controls in a manner known per se rotation of the shaft 41.

The lever further comprises an overhanging arm 63 provided at its end with a shoe 64 moving during vertical displacement of the shaft 50 along a guide 65 incorporated by the bottom bearing 42 for the shaft 41 carrying the suction heads. The bottom end of the shaft 50 carries an arm 66 having attached thereto the end of the spring 67 which constantly biasses the shaft 50 together with platform 49 upwardly.

The platform 49 which is turned upwardly has a supporting surface for the cloth and paperboard blanks superimposed thereon. The said surface is adjustable to suit various sizes and can be either continuous for small size book-covers as indicated in FIGURE 6, or discontinuous for large size book-covers as shown by PT in FIGURE 3. The marginal portions of the said surface are in any case arranged along the sides of a rectangle having a pair of parallel sides and a pair of perpendicular sides to the side-walls 1a, 1b.

The area of the rectangle is selected smaller than the cloth area considering the necessity of bending the cloth margins around the edges of the paperboard blanks.

Bending over of the cloth margins is effected in a known manner by devices which comprise a pair of bars 69, FIGURE 9, rectangular in cross section, perpendicular to the sidewalls 1a, 1b, and a pair of bars 68, FIGURE 4, respectively, similar and parallel to the said sidewalls, located lower than the bars of the former device.

The bars in each pair are spaced to let through therebetween the platform 49 and permit upturning simultaneously of the marginal portions adjacent thereto of the cloth carried by the platform.

Each bar carries moreover a blade slidably mounted thereon in such manner as to emerge from the bar wall in the direction towards the other bar in the same pair. By moving out of the bars the blades thereon effect superimposition of the upturned margins of the cloth on the marginal portions of the upwardly turned faces of the paperboard blanks glued to the cloth on the platform. The blade movements are effected through the interposition of leverages and further members known per se from a disc 70, FIGURE 5, mounted on the cam shaft 32 and formed in its opposite faces with continuous cam grooves 71, 72, respectively, the former effecting movements of the blades carried by the bars perpendicular to the sidewalls 1a, 1b, the latter effecting the movements of the blades in the other bar pair. Spacing of the blades in each pair and location thereof with respect to the sidewalls 1a, 1b are of course variable, the bars being of a length such that operation is possible even when the machine is equipped with a platform for largest-size book-covers.

During operation of the machine the platform 49 performs vertical movements synchronously with the movements of the shaft 41 carrying the suction heads. When the arm 45 is in its topmost position and the suction heads are above the paperboard feed station and above the platform 49, respectively, the latter suction head, which carries two paperboard blanks and the back portion is higher than the bars 69 or so-called first fold bars and receives in a manner known per se the cloths which have been previously coated with adhesive on their upwardly turned face, and are delivered by the cloth cylinder 40. The latter suction head is stationary till the moment the shaft 41 by lowering superimposes two paperboard blanks and a back portion on the cloth carried by the platform 49. At this stage the shaft 41 and platform 49 start simultaneously their downward motion to the level at which the blades on the bars 69 can emerge from the latter to tilt the marginal portions of the cloth, which are perpendicular to the sidewalls 1a, 1b, onto the surface of the platform 49.

During this operation the shaft 41 is slightly raised and the blades emerging from the bars 68 hold the paperboard blanks in position on the platform 49. Subsequently, the shaft 41 is again lowered and causes the suction head to adhere to the paperboard blanks now glued to the cloth. Thereupon, the platform 49 and shaft 41 simultaneously move downwardly to the level at which the blades on the bars 68 can emerge from the latter to tilt the margins of the cloth parallel with the sidewalls 1a, 1b, onto the plane of the platform 49. As the blades start emerging from the bars 68 the shaft 41 begins rising towards its topmost position at which it can be rotated. On completion of folding the platform moves further down to the lever at which it will expel from the machine the finished book-cover through a press P (FIG. 5).

The means for removing finished book-covers from the platform 49 comprises a slide 73 slidably mounted on a guide rod 74 extending across the machine from one sidewall to the other. The slide 73 and guide 74 therefor are offset from the platform 49 in a direction towards the shaft 41. The slide 73 has secured to its top a bar 75 the latter is situated at a height at which it is in a condition to engage the finished book cover on the platform 49 in the lowermost position of the latter. The end of the bar 75 opposite its end secured to the slide 73 carries an extension 76, FIGURE 7, which is guided in a groove cut in the cross member 54 having attached thereto one end of the central plate 53 underlying the platform 49.

The slide 73 is secured to a sprocket chain which travels in proximity to the sidewall 1b over a sprocket wheel 78 supported in a manner to be described hereafter by the rear cross wall 43 of the machine frame, and in proximity to the sidewall 1a over two idle wheels 79, 80, respectively.

Movement of the wheel 78 and, consequently, of the chain 77 and slide 73 is derived from a continuous cam groove 81 formed in the face of a disc 82 mounted on the cam shaft 32, turned towards the sidewall 1a.

To this end the groove 81 in the disc 82 constantly engages a roller 83 carried by the end of an arm 84 of a bell crank lever mounted for oscillation on a cross shaft 86 supported by the side walls 1a, 1b. The other arm 85 of the bell crank lever carries at its end articulated thereto a link 87 articulated by its other end to a vertical rack 88. The latter is slidably mounted in a guide open towards the sidewall 1b, secured to the rear cross wall 43. Teeth 89 in the rack 88 constantly mesh with a pinion 90 mounted on a sleeve 91 rotatably but not axially displaceably carried by a pivot 92 secured by means of a collar 93 to the wall 43. The sleeve 91 is provided with a flange 94 which is somewhat spaced from the end of the sleeve opposite the wall 43. The sleeve portion between, the flange 94 and the said sleeve end has slipped thereon in succession a ring 95 made of friction material, the hub sprocket wheel 78 over which the sprocket chain 77 travels, a further ring 96 of friction material and, finally the end of a tumbler 97.

By screwing a screw 99 into the tumbler 97 the components 95–78–96 are clamped against the flange 94. Consequently, by acting on screw 99 the mutual angular position of the sleeve 91 and sprocket wheel 78 can be adjusted. Since the cam groove 81 is such as to effect on each revoltuion of the cam shaft the necessary movements of the bell crank lever 84–86 in order to reciprocate by a fixed extent through rack 88, pinion 90, sleeve 91, sprocket wheel 78 and sprocket chain 77 the bar 75, obviously the mechanism as described serves for varying the end positions in reciprocation of the bar 75.

It will be understood that, within the principle of this invention, embodiment thereof can be widely varied with respect to the example described and shown without departing from the scope of this invention.

More particularly, in machines which, for special reasons, shall not be equipped with an adjustable coupling between the pinion meshing with the reciprocating rack and toothed wheel having the slide carrying the discharge bar secured thereto, the starting position of the bar can be varied by securing the bar carrying slide to different regions on the sprocket chain and providing the slide to this end with divided vice for engaging the chain.

What I claim is:
1. In a book cover making machine of the type referred to having a frame, a camshaft journaled in said frame and a vertically adjustable platform guided in said frame and adapted to hold a book cover while glueing a cloth cover to said book cover, means for removing finished book covers from said platform comprising a horizontal bar mounted for lateral displacement in the machine, arranged at a height such as to engage the book cover on said platform when the latter is in its position corresponding to completion of the automatic book cover making step, a pair of stationary guides for guiding the opposite ends of said bar, a mechanism for reciprocating said bar including means for varying the starting position of the latter, said mechanism comprising a disc keyed on said camshaft and having a cam groove cut in one side thereof, a bell-crank lever pivoted at one end to said frame and having means intermediate its ends engaging said groove, a vertically reciprocable rack actuated by the other end of said bell-crank lever, a pinion meshing with said rack, a shaft rotatably mounted in said frame and arranged perpendicularly to the direction of the displacement of said bar, a sprocket wheel mounted on said shaft, releasable coupling means interposed between said sprocket wheel and said shaft allowing angular adjustment relative therebetween, idle guide wheels mounted in said frame at a region remote from said sprocket wheel, a continuous chain traveling over said sprocket and guide wheels and having secured thereto the end of said bar guided by said stationary guides.

2. In a book cover making machine as set forth in claim 1 wherein said releasable coupling means comprising an annular flange mounted on said shaft and spaced inwardly from one end thereof, said sprocket wheel being rotatably mounted on the end of said shaft outwardly of said annular flange, an end member detachably secured to the end of said shaft and providing a flange member adapted to oppose the flange member on the shaft on the opposite side of the sprocket wheel, friction means interposed between the sprocket wheel and said flanges whereby upon loosening of the end member the sprocket wheel may be rotated relative to the shaft and secured in a new location relative thereto upon tightening of the end member.

3. In a book cover making machine of the type referred to having a frame, a vertically adjustable platform guided in said frame and adapted to hold a book cover while glueing a cloth cover to said book cover, means for removing the finished book cover from said platform comprising a horizontal bar mounted for lateral displacement in the machine arranged at a height such as to engage the book cover on said platform when the latter is in its position corresponding to completion of the automated book cover making step, means for reciprocating said bar including means for varying the starting position of said bar, press means adjacent said platform and means for reciprocating said bar toward and away from said press means whereby said bar will have a stroke length substantially equal to the spacing between the edge of the smallest size book cover, remote from said bar, which can be manufactured by the machine and said press means.

References Cited by the Examiner

UNITED STATES PATENTS

| | | | |
|---|---|---|---|
| 513,453 | 1/1894 | Coles et al. | 11—2 |
| 1,748,848 | 2/1930 | Murray | 11—2 |
| 2,364,142 | 12/1944 | Holdmann | 11—2 |

EUGENE R. CAPOZIO, *Primary Examiner.*

LAWRENCE CHARLES, *Examiner.*